Oct. 15, 1940.   B. DICK ET AL   2,218,192

BRAKING MECHANISM

Filed July 31, 1939

INVENTORS
BURNS DICK
STEVE SCHNELL
BY
E. E. Huffman
ATTORNEY

Patented Oct. 15, 1940

2,218,192

UNITED STATES PATENT OFFICE 2,218,192

BRAKING MECHANISM

Burns Dick, Ferguson, and Steve Schnell, Overland, Mo., assignors to Wagner Electric Corporation, St. Louis, Mo., a corporation of Delaware Application July 31, 1939, Serial No. 287,570

8 Claims. (Cl. 188—152)

Our invention relates to braking mechanism and more particularly to a brake shoe construction and mounting therefor.

One of the objects of our invention is to provide in a brake assembly an improved brake shoe construction and actuating means therefor whereby said shoe is capable of acting as a self-energized shoe in both directions of rotation of the drum.

Another and more specific object of our invention is to so mount a brake shoe on a support by means of a pivoted member that said shoe acts as a pivoted self-energized shoe when actuated at its "forward" end in either direction of rotation of the drum.

Figure 1:
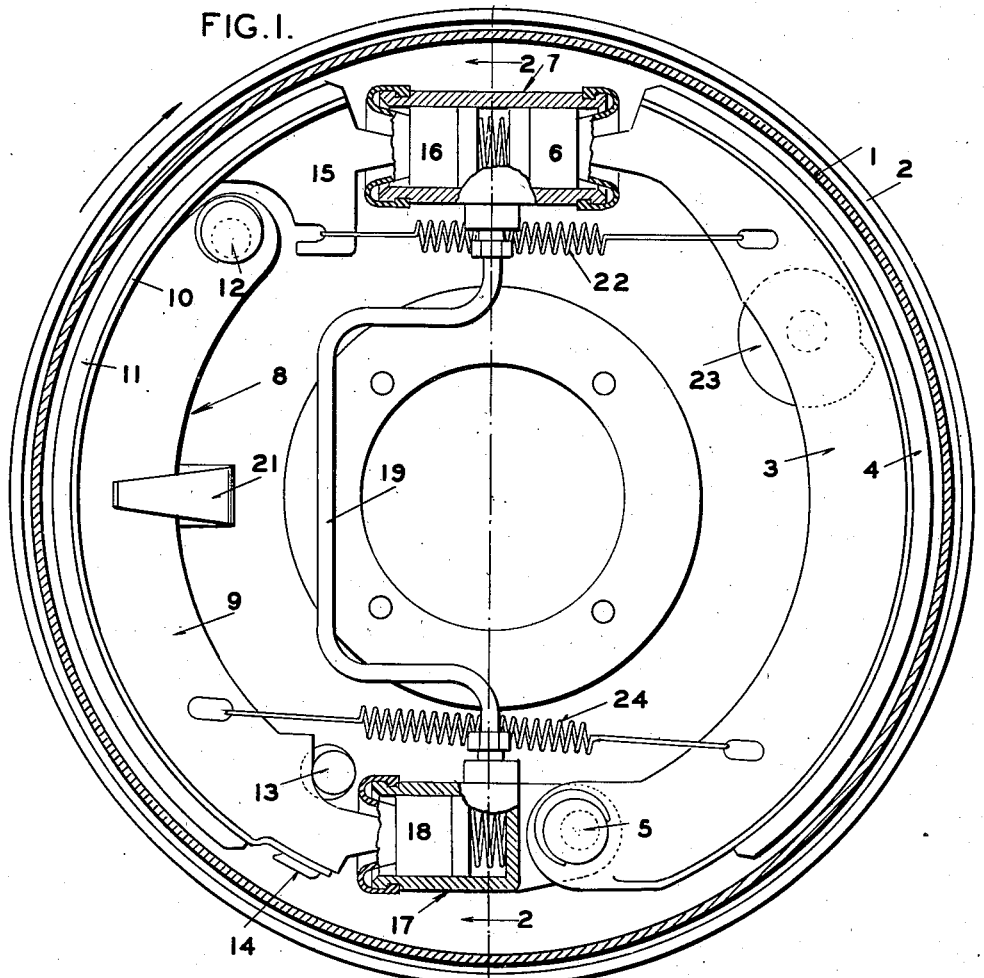
Figure 2:
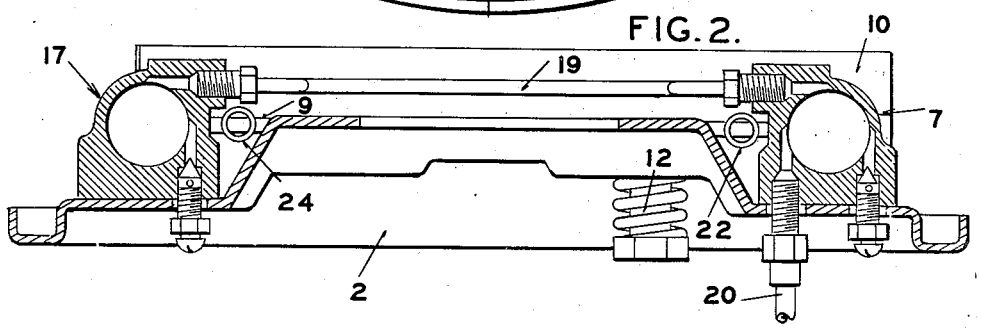

Other objects of our invention will become apparent from the following description taken in connection with the accompanying drawing in which Figure 1 is a side view, partly in section, of a brake assembly provided with a brake shoe construction embodying our invention; and Figure 2 is a cross-sectional view taken on the line 2—2 of Figure 1.

Referring to the drawing in detail, the numeral 1 indicates a drum which is secured to a rotatable member such as a vehicle wheel, and 2 is a support or backing plate secured to some suitable fixed member. Within the drum is a shoe 3 carrying lining 4 and being pivotally mounted at one end on the support by an eccentric anchor pin 5. The other end of this shoe is actuated into engagement with the drum by piston 6 of the double piston fluid motor 7 mounted on the backing plate.

Also mounted within the drum for cooperation with the inner surface thereof is a brake shoe construction generally indicated at 8 and which comprises an arcuate lever arm 9 and a brake shoe 10 carrying lining 11. The lever arm is rigid and pivotally mounted at its upper end on the backing plate by an eccentric adjustable anchor pin 12 and has its other and free end cooperating with an adjustable stop 13. The brake shoe 10 is flexible and unattached to the lever arm 9 except at its lower end where it is secured by means of an attaching lug 14 to the free end of the lever arm 9. The unattached upper end of the shoe 10 has secured thereto, as by welding, a reinforcing member 15 which cooperates with the other piston 16 of the double piston fluid motor 7 whereby pressure may be applied to this free end of the shoe. There is also provided a single piston fluid motor 17 positioned diametrically opposite the fluid motor 7, the piston 18 of which cooperates with the free end of the lever arm 9 for moving this arm toward the drum and by means of said arm applying the shoe 10 to the drum. The fluid motor 17 is mounted on the anchor pin 5 in order to permit the anchor pin to take the reaction from the fluid motor and to better balance the forces. The fluid motors 7 and 17 communicate with each other by means of a conduit 19 and the fluid motor 7 is connected by a conduit 20 to a suitable source of pressure such, for example, as the usual foot-operated master cylinder.

A leaf spring guide 21 is mounted on the backing plate and cooperates with the lever arm 9 to resiliently maintain it in proper "off" position. A spring 22 is connected to the reinforcing member 15 on the shoe 10 and to the upper end of shoe 3 for retracting the shoe 3 and the free end of shoe 10 from the drum. An adjustable stop 23 is provided for shoe 3 to determine its "off" position, the "off" position of shoe 10 being determined by the position of the adjustable anchor 12. There is also provided a spring 24 connected to the lever arm 9 and to the lower end of shoe 3 for normally holding arm 9 against the adjustable stop 13.

In operation, when the drum is rotating in the direction indicated by the arrow, which corresponds to the forward direction of the vehicle, and the fluid motors 7 and 17 are simultaneously operated, shoe 3 will be forced into engagement with the drum by means of the piston 6 and will act as an ordinary "forward" shoe pivotally anchored at its heel end. Also, piston 18 of the fluid motor 17 will act upon lever arm 9 and force this lever arm toward the drum and, since the flexible shoe 10 is secured to the end of lever arm 9, it will be forced into engagement with the drum. The shoe and the lever arm under these conditions will act as though the lever arm were secured to the shoe throughout the entire arc of contact between the two members. The piston 16 of fluid motor 7 will force the free end of shoe 10, which is not contacted by the lever, into engagement with the drum. The force applied by piston 16, however, is not sufficient to cause the lever arm to be forced away from the drum since the force being applied by piston 18 plus the force created by the drag of the drum on shoe 10 is greater than the force being applied by piston 16. It is thus seen that the action of the shoe construction 8, comprising lever arm 9 and flexible shoe 10, is the same as a "forward" shoe pivoted at its heel end. Since both shoes act as "forward" shoes, the brake will produce maximum braking torque.

When the drum is rotating in the direction opposite that indicated by the arrow, shoe 3 will be applied to the drum in the same manner as previously described, but since the rotation of the drum is opposite, this shoe will act as a "reverse" shoe. When piston 16 brings shoe 10 into engagement with the drum, the shoe will act as a "forward" shoe since its lower end will anchor against stop 13 through the end of lever arm 9. The shoe 10 will swing away from contact with the lever arm 9 and will act in the same manner as though the lower end of the shoe were pivotally mounted since the shoe is made from a flexible material and is free to flex at its point of securement with the free end of lever arm 9. The force acting on shoe 10 by piston 16 plus the force created by the drag of the drum on shoe 10, will be greater than any force which is acting on lever arm 9 by piston 18 and thus the piston will not move the lever arm away from stop 13. It is thus seen that when the drum is rotating in the direction opposite that indicated by the arrow, the shoe construction 8 will act as a "forward" shoe, and shoe 3 as a "reverse" shoe, thus producing sufficient braking torque for all necessary purposes.

With the mechanism just described there is provided a brake wherein one of the shoes is capable of acting as a "forward" shoe in both directions of rotation, and when it is combined with an ordinary pivoted shoe, produces a brake wherein both shoes can act as "forward" shoes under conditions requiring maximum braking torque and also a brake wherein the shoes will be capable of producing sufficient braking torque under conditions where maximum braking torque is not required.

It is also to be noted that with the shoe construction and its mounting, it is definitely secured to the backing plate and is not capable of floating between anchors positioned at opposite ends. This permits shoe 10 to be smoothly applied to the drum during both directions of rotation thereof.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In braking mechanism, a support, a brake drum, two coextensive arcuate members one of which is adapted to cooperate with the drum, means for connecting one of the adjacent ends of said members together so as to prevent relative circumferential movement of said members in either direction, means for pivotally mounting on the support the unconnected end of the member which does not engage the drum, and fluid pressure means for simultaneously applying force to each end of the member which cooperates with the drum.

2. In braking mechanism, a support, a brake drum, a lever arm, a separate coextensive brake shoe, means connecting the lever arm and the brake shoe together at one of their adjacent ends only so as to prevent relative circumferential movement in either direction, means for pivotally mounting the unconnected end of the lever arm on the support, means for applying pressure to the unconnected end of the brake shoe, and other means for applying pressure to the other end of the brake shoe.

3. In braking mechanism, a support, a brake drum, an arcuate lever arm pivoted at one end to the support, a separate brake shoe coextensive with the lever arm and positioned between said lever arm and the drum, means for securing the free end of the lever arm to the adjacent end of the brake shoe so as to prevent relative circumferential movement in either direction, a stop for limiting the extent of movement of the lever arm away from the drum, and means for applying pressure simultaneously to the free end of the lever arm and to the free end of the brake shoe.

4. In braking mechanism, a support, a brake drum, an arcuate lever arm pivoted at one end to the support, a separate brake shoe coextensive with the lever arm and positioned between said lever arm and the drum, means for securing the free end of the lever arm to the adjacent end of the brake shoe so as to prevent relative circumferential movement, a stop for limiting the extent of movement of the lever arm away from the drum, a fluid motor for actuating the free end of the lever arm, a second fluid motor positioned adjacent the pivoted end of the lever arm for actuating the free end of the brake shoe, and means for operating the fluid motors simultaneously.

5. In braking mechanism, a support, a brake drum, a brake shoe comprising a flexible member extending over a substantial arc of the drum surface and provided with lining, an arcuate lever coextensive with the flexible member and pivotally mounted on the support at one end and so connected to the flexible member at its other end as to prevent the flexible member from having relative circumferential movement thereto in either direction, and fluid pressure means for simultaneously applying pressure to each end of the flexible member.

6. In braking mechanism, a support, a brake drum, a brake shoe comprising a flexible member provided with lining, an arcuate lever arm coextensive with the flexible member, means for pivotally mounting one end of the lever arm to the support, means for securing the free end of the lever arm and the adjacent end of the flexible member together, a stop carried by the support adjacent the free end of the lever arm for limiting its extent of movement away from the drum, a fluid motor for applying pressure to the free end of the lever arm, a second fluid motor for applying pressure to the unconnected end of the flexible member which is positioned adjacent the pivotal mounting of the lever arm, and means for simultaneously operating both of said fluid motors.

7. In braking mechanism, a support, a brake drum, two brake shoes positioned in the drum in end-to-end relation, means for pivotally mounting one end of one of said shoes on the support, a lever arm coextensive with the other brake shoe, means for pivotally mounting the end of said lever arm which is adjacent the free end of the first named shoe on the support, means for connecting the free end of the lever arm and the adjacent end of the second named shoe together, a fluid motor for simultaneously applying pressure to the free end of the first named shoe and the adjacent end of the second named shoe, a second fluid motor for applying pressure to the free end of the lever arm, and means for simultaneously operating said fluid motors.

8. In braking mechanism, a support, a brake drum, two brake shoes positioned in the drum in end-to-end relation, means for pivotally mounting one end of one of said shoes on the support, a lever arm coextensive with the other brake shoe, means for pivotally mounting the end of said lever arm which is adjacent the free end of the first named shoe on the support, means for connecting the free end of the lever arm and the adjacent end of the second named shoe together, a stop for limiting the movement of the free end of the lever arm away from the drum, a spring for biasing said lever against the stop, a fluid motor for simultaneously applying pressure to the free end of the first named shoe and the adjacent end of the second named shoe, a second fluid motor for applying pressure to the free end of the lever arm, and means for simultaneously operating said fluid motors.

BURNS DICK.
STEVE SCHNELL.